United States Patent [19]
Gajewska

[11] Patent Number: 5,914,723
[45] Date of Patent: Jun. 22, 1999

[54] METHOD AND SYSTEM FOR CONVERTING IMAGES IN COMPUTER SYSTEMS

[75] Inventor: Hania Gajewska, Woodside, Calif.

[73] Assignee: Sun Microsystems, Inc., Palo Alto, Calif.

[21] Appl. No.: 08/777,755

[22] Filed: Dec. 30, 1996

[51] Int. Cl.$^6$ ................................................. G06F 15/00
[52] U.S. Cl. ............................................................. 345/431
[58] Field of Search ...................................... 345/431, 339, 345/340, 342, 346

[56] References Cited

U.S. PATENT DOCUMENTS

| | | | |
|---|---|---|---|
| 5,602,996 | 2/1997 | Powers, III et al. | 345/340 |
| 5,825,360 | 10/1998 | Odam et al. | 345/344 |

*Primary Examiner*—Phu K. Nguyen
*Attorney, Agent, or Firm*—McDermott, Will & Emery

[57] ABSTRACT

The present invention provides a method and system in computer systems for converting an original image into another image having fewer colors than the original image. This method and system attempt to preserve the contrast of the original image. As a result, this method and system are particularly well-suited for converting images that are relatively small in size. A computer system in which the present invention operates includes a computer connected to a display device and a secondary storage device. An image converter is stored in the secondary storage device for execution by the computer. In operation, the computer receives an original image to be displayed on the display device. The image converter converts the original image into another image having fewer colors than the original image. Lastly, the computer displays the converted image on the display device. In order to convert the original image, the image converter determines which pixels in the original image are opaque in the converted image. For the pixels that are opaque in the converted image, the image converter determines a gray-scale representation of the pixels. For the same pixels, the image converter then determines a black-and-white representation of the pixels. Next, the image converter determines the color assigned to the black pixels in the converted image and the color assigned to the white pixels in the converted image. Lastly, the image converter specifies the representation of the converted image.

35 Claims, 11 Drawing Sheets

METHOD AND SYSTEM FOR CONVERTING IMAGES IN COMPUTER SYSTEMS

FIELD OF THE INVENTION

The present invention relates generally to converting images in computer systems and, more particularly, to a method and system in computer systems for converting an original image into another image having fewer colors than the original image.

BACKGROUND OF THE INVENTION

Computer systems display images on display devices. These images may be color images. On occasion, an image including q colors may need to be displayed in a computer system that only supports p colors, where p is less than q. Such a situation may arise, for example, if an image (or an application that displays an image) designed in one computer system that supports q colors is ported to another computer system that only supports p colors (again, where p is less than q). In this situation, the image including q colors must be converted into an image including p colors so that the image can be displayed in the second computer system.

Known methods for converting an image including q colors into an image including p colors (where p is less than q) involve mapping from the q colors to the p colors. Two known methods are the popularity algorithm and the median-cut algorithm. For a more detailed discussion of these known methods, see *Computer Graphics, Principles and Practice*, pp. 599–600, by James D. Foley, Andries van Dam, Steven K. Feiner, and John F. Hughes (2nd Edition, Addison-Wesley Publishing Company, Inc., 1990).

These known methods for converting an image are satisfactory for a relatively large image. However, when the image is relatively small in size, these methods are not satisfactory. The problems with these methods can be illustrated with an example.

FIG. 1 shows an image, such as a cursor 10 having three (3) colors. The cursor 10 includes a green block 12, a yellow block 14 partially overlaying the green block, and a black border 16 around the visible portions of both blocks. FIG. 2 shows the cursor 10 after it has been converted into another cursor having two (2) colors using the known methods for converting an image discussed above. As can be seen from the figures, the green block remains green, the yellow block remains yellow, and the black border becomes yellow.

If the converted cursor shown in FIG. 2 is never displayed on a yellow background, the problems with the known conversion methods will not be readily apparent. If the converted cursor is, however, displayed on a yellow background (as shown in FIG. 3), the problems with the known methods are immediately apparent. As can be seen from the figure, the yellow block blends with the yellow background and the shape of the cursor becomes distorted.

The problems with the known conversion methods occur because these methods attempt to preserve the predominant colors of the original image. As a result, these methods often sacrifice the contrast of the original image. In an image that is relatively small in size, the preservation of contrast is more important than the preservation of the predominant colors. Therefore, a need exists to convert an original image into another image having fewer colors than the original image while preserving the contrast of the original image.

SUMMARY OF THE INVENTION

The preferred embodiment of the present invention provides a method and system in computer systems for converting an original image into another image having fewer colors than the original image. This method and system attempt to preserve the contrast of the original image. As a result, this method and system are particularly well-suited for converting images that are relatively small in size.

A computer system in which the preferred embodiment of the present invention operates includes a computer for controlling the operation of the system. The computer is connected to a display device and a secondary storage device. An image converter is stored in the secondary storage device for execution by the computer.

In operation, the computer receives an original image to be displayed on the display device. The image converter converts the original image into another image having fewer colors than the original image. Lastly, the computer displays the converted image on the display device.

In order to convert the original image, the image converter determines which pixels in the original image are opaque in the converted image. For the pixels that are opaque in the converted image, the image converter determines a gray-scale representation of the pixels. For the same pixels, the image converter then determines a black-and-white representation of the pixels. Next, the image converter determines the color assigned to the black pixels in the converted image and the color assigned to the white pixels in the converted image. Lastly, the image converter specifies the representation of the converted image.

DETAILED DESCRIPTION OF THE PREFERRED EMBODIMENT

The preferred embodiment of the present invention provides a method and system in computer systems for converting an original image into another image having fewer colors than the original image. This method and system attempt to preserve the contrast of the original image. As a result, this method and system are particularly well-suited for converting images that are relatively small in size.

Figure 4:
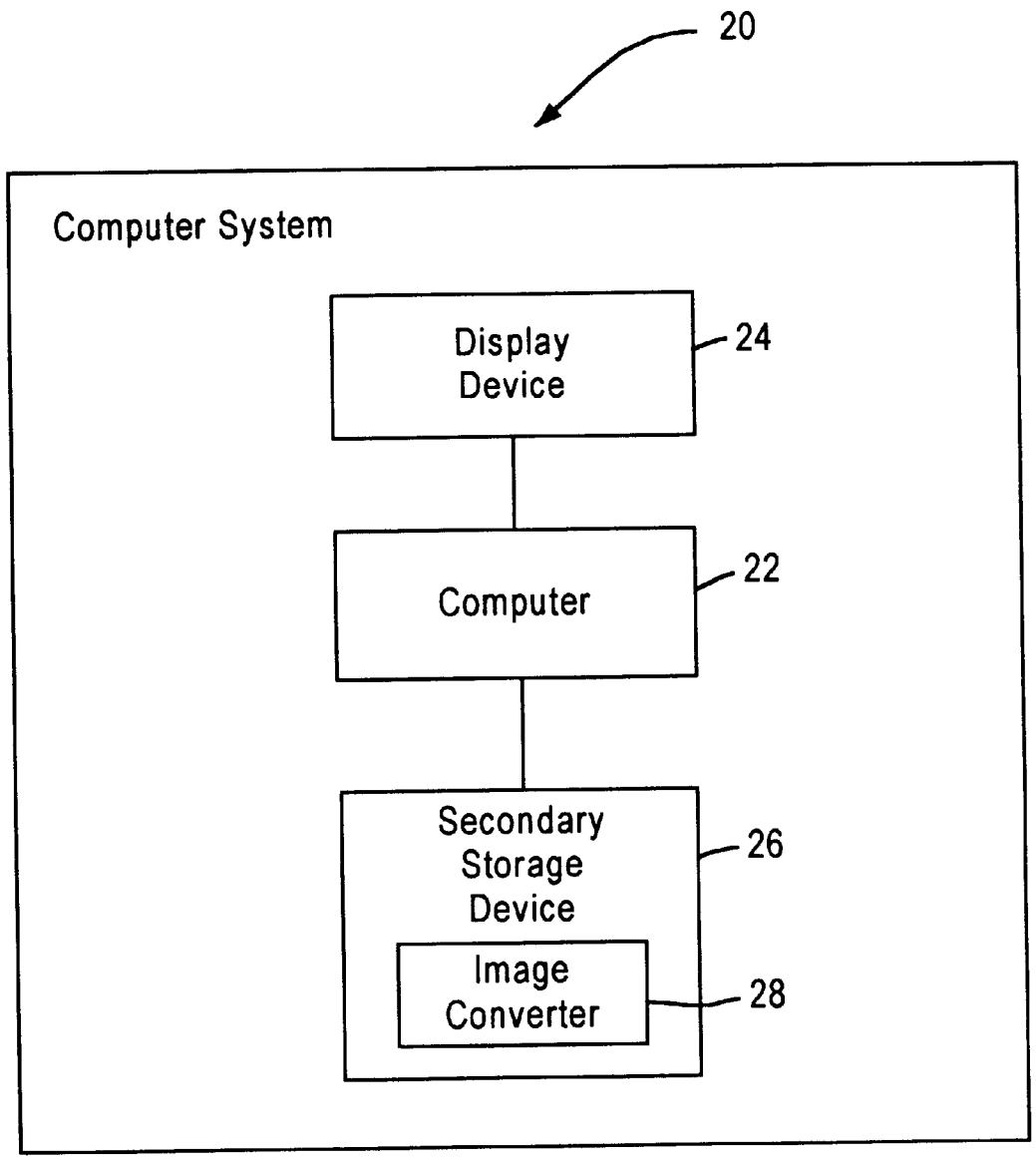
FIG. 4 is a block diagram illustrating the components of a computer system in which the preferred embodiment of the present invention operates.

A computer system 20 in which the preferred embodiment of the present invention operates is illustrated in FIG. 4. The computer system 20 includes a computer 22 for controlling the operation of the system. The computer 22 is connected to a display device 24 and a secondary storage device 26. The secondary storage device 26 may be any of various well-known secondary storage devices, such as a CD-ROM, a diskette, or a hard disk. An image converter 28 is stored in the secondary storage device 26 for execution by the computer 22.

The computer 22 typically includes a central processing unit and a primary storage device (not separately shown). Additionally, the computer 22 typically is connected to any number of input/output ("I/O") devices, such as display devices, keyboards, printing devices, and secondary storage devices (not separately shown other than display device 24 and secondary storage device 26). These components of the computer system 20 are well-known in the art and will not be discussed in greater detail.

For the sake of simplicity, the computer system 20 of the present invention has been illustrated with a stand-alone computer 22 connected to a single display device 24 and a single secondary storage device 26. However, one of ordinary skill in the art will appreciate that the computer system 20 could include any number of computers and other components, including components other than those separately shown. These computers and other components would be connected to one another either directly or via a network.

Figure 5:
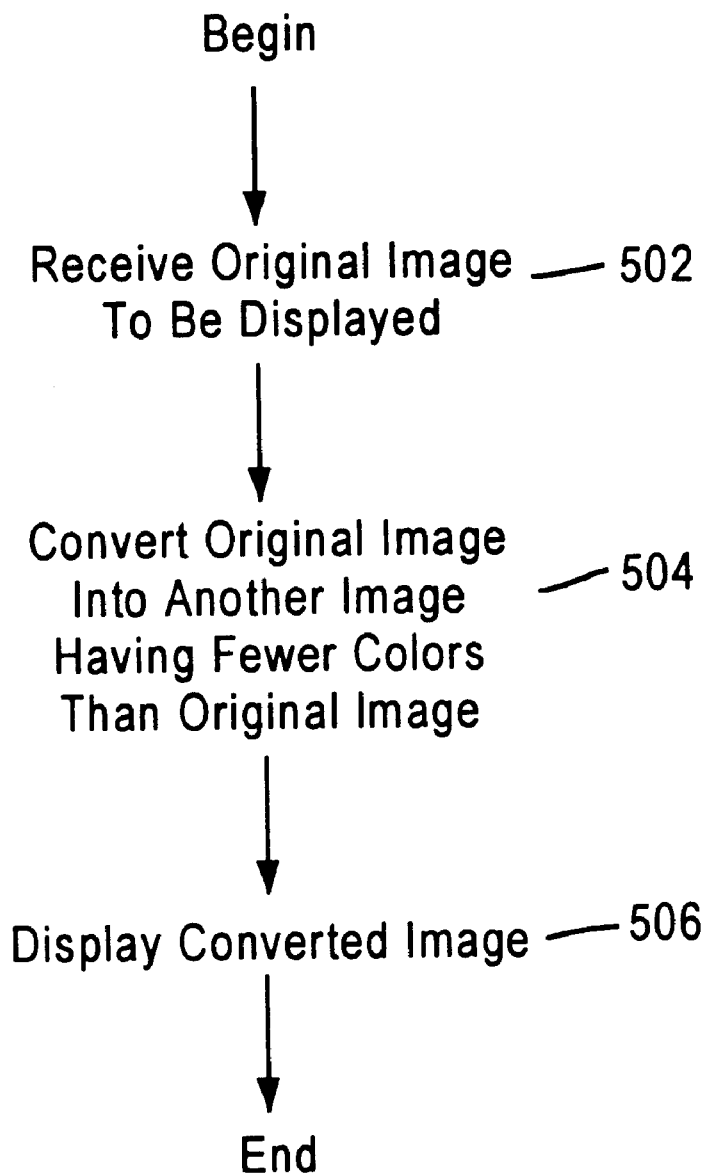
FIG. 5 is a flowchart generally illustrating the preferred steps performed in the operation of the computer system of FIG. 4.

FIG. 5 generally illustrates the preferred steps performed in the operation of the computer system of the present invention. Initially, the computer 22 receives an original image to be displayed on the display device 24 (step 502). The image converter 28 converts the original image into another image having fewer colors than the original image using the principles of the present invention (step 504). Lastly, the computer 22 displays the converted image on the display device 24 (step 506).

An image is a two-dimensional array of pixels that are displayed on a display device. Each pixel in the image is represented by a pixel value. Each pixel value comprises one or more bits and defines the characteristics of the corresponding pixel in the image, e.g., the color and the opacity of the pixel. The dimensions of the array of pixels are referred to as the width and height of the image. The number of bits comprising each pixel value is referred to as the depth of the image.

With a black-and-white image, each pixel value comprises a single bit. In this case, an array of pixel values is referred to as a bitmap. With a gray or color image, each pixel value comprises a plurality of bits. In this case, an array of pixel values is referred to as a pixmap. A pixmap is essentially a plurality of bitmaps, where the number of bitmaps is equal to the number of bits comprising each pixel value (i.e., the depth of the image). Technically, a bitmap is an array of pixel values where each pixel value comprises a bit and a pixmap is an array of pixel values where each pixel value comprises a plurality of bits. Generally, however, the term bitmap is often used to refer to both bitmaps and pixmaps.

In a preferred embodiment of the present invention, the original image and the converted image are cursors. A cursor is an image that is displayed on a display device to show the current position of an input device associated with the cursor. For example, the cursor associated with a mouse would show the current position of the mouse. In many computer systems, cursors can have arbitrary characteristics, such as color and opacity. The characteristics permitted in different computer systems may vary.

For example, in a computer system including a NEXTSTEP environment, cursors can have an arbitrary number of colors and arbitrary levels of opacity. The NEXTSTEP environment was developed by NeXT Computer, Inc., 900 Chesapeake Drive, Redwood City, Calif. 94063. However, in a computer system including an X WINDOW SYSTEM environment (in particular, an X11 WINDOW SYSTEM environment), cursors are limited to two (2) colors and two (2) levels of opacity. The X/X11 WINDOW SYSTEM environment was developed by the Massachusetts Institute of Technology, Cambridge, Mass. Therefore, if an application program that was written in the NEXTSTEP environment is ported to the X11 WINDOW SYSTEM environment, any cursor displayed by the application program has to be converted from a cursor representation in the NEXTSTEP environment into a cursor representation in the X11 WINDOW SYSTEM environment.

In a preferred embodiment of the present invention, the original image is a cursor in the NEXTSTEP environment. In the NEXTSTEP environment, cursors typically have a width of sixteen (16) pixels and a height of sixteen (16) pixels. Each pixel in the NEXTSTEP cursor can be an arbitrary color and can have an arbitrary level of opacity. The NEXTSTEP cursor is represented by an array of pixel values that has the same dimensions as the NEXTSTEP cursor (typically, sixteen (16) pixel values by sixteen (16) pixel values). Each pixel value in the array comprises a plurality of bits. The number of bits in and the physical representation of the pixel values in the array may vary. For example, each pixel value in the array may comprise sixteen (16) bits. The bits in each pixel value could define the characteristics (i.e., the color and the level of opacity) of the corresponding pixel in the NEXTSTEP cursor as follows:

1. four (4) bits define the red component of the color of the pixel;
2. four (4) bits define the green component of the color of the pixel;
3. four (4) bits define the blue component of the color of the pixel; and
4. four (4) bits define the opacity of the pixel.

Additionally, in a preferred embodiment of the present invention, the converted image is a cursor in the X11 WINDOW SYSTEM environment. In the X11 WINDOW SYSTEM environment, cursors can have various widths and heights that are selected from a set of available widths and heights. Each pixel in the X11 cursor can be only one (1) of two (2) colors (a foreground color or a background color) and can be either opaque or transparent. The X11 cursor is represented by the foreground color, the background color, a source bitmap, and a mask bitmap. These colors and bitmaps define the characteristics (i.e., the color and the level of opacity) of the pixels in the X11 cursor as follows:

1. the foreground color defines the color of the pixels in the foreground of the X11 cursor, typically specified as a red-green-blue triplet;
2. the background color defines the color of the pixels in the background of the X11 cursor, typically specified as a red-green-blue triplet;
3. the source bitmap defines which pixels in the X11 cursor are displayed in the foreground color and which pixels in the X11 cursor are displayed in the background color, it comprises an array of bits that has the same dimensions as the X11 cursor (typically, sixteen (16) bits by sixteen (16) bits), each bit in the source bitmap corresponds to a pixel in the X11 cursor, the pixels in the X11 cursor corresponding to "1" bits in the source bitmap are displayed in the foreground color and the pixels in the X11 cursor corresponding to "0" bits in the source bitmap are displayed in the background color; and
4. the mask bitmap defines which pixels in the X11 cursor are opaque and which pixels in the X11 cursor are transparent, it comprises an array of bits that has the same dimensions as the X11 cursor (typically, sixteen (16) bits by sixteen (16) bits), each bit in the mask bitmap corresponds to a pixel in the X11 cursor, the pixels in the X11 cursor corresponding to "1" bits in the mask bitmap are opaque (i.e., the foreground or background color specified in the source bitmap is displayed in the X11 cursor) and the pixels in the X11 cursor corresponding to "0" bits in the mask bitmap are transparent (i.e., the foreground or background color specified in the source bitmap is not displayed in the X11 cursor).

Figure 6:
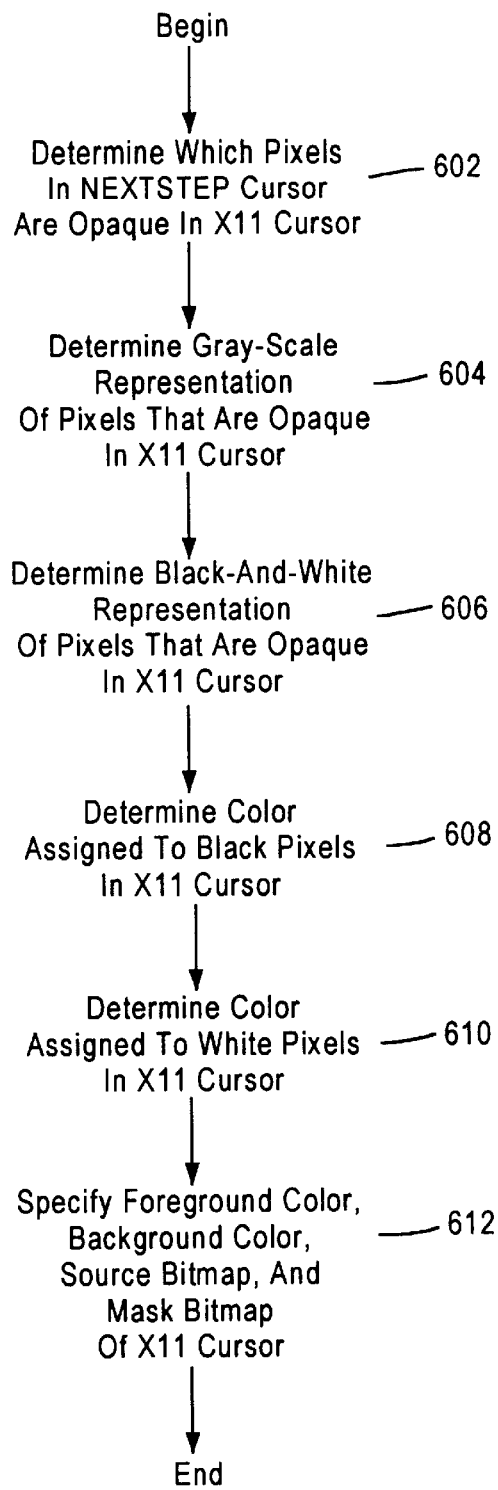
FIG. 6 is a flowchart illustrating in greater detail the preferred step of converting an original image, as generally illustrated in FIG. 5.

FIG. 6 illustrates the preferred step of converting the original image using the principles of the is present invention (step 504) in greater detail. As stated above, in a preferred embodiment of the present invention, the original image is a NEXTSTEP cursor and the converted image is an X11 cursor. Therefore, for ease of reference in discussing FIGS. 6–11, the original image will be referred to as the NEXTSTEP cursor and the converted image will be referred to as the X11 cursor. However, one of ordinary skill in the art will appreciate that the original image and the converted image could be other images.

Initially, the image converter determines which pixels in the NEXTSTEP cursor are opaque in the X11 cursor (step 602). For the pixels that are opaque in the X11 cursor, the image converter determines a gray-scale representation of the pixels (step 604). For the same pixels, the image converter then determines a black-and-white representation of the pixels (step 606). Next, the image converter determines the color assigned to the black pixels in the X11 cursor (step 608) and the color assigned to the white pixels in the X11 cursor (step 610). Lastly, the image converter specifies the foreground color, the background color, the source bitmap, and the mask bitmap of the X11 cursor (step 612).

Figure 7:
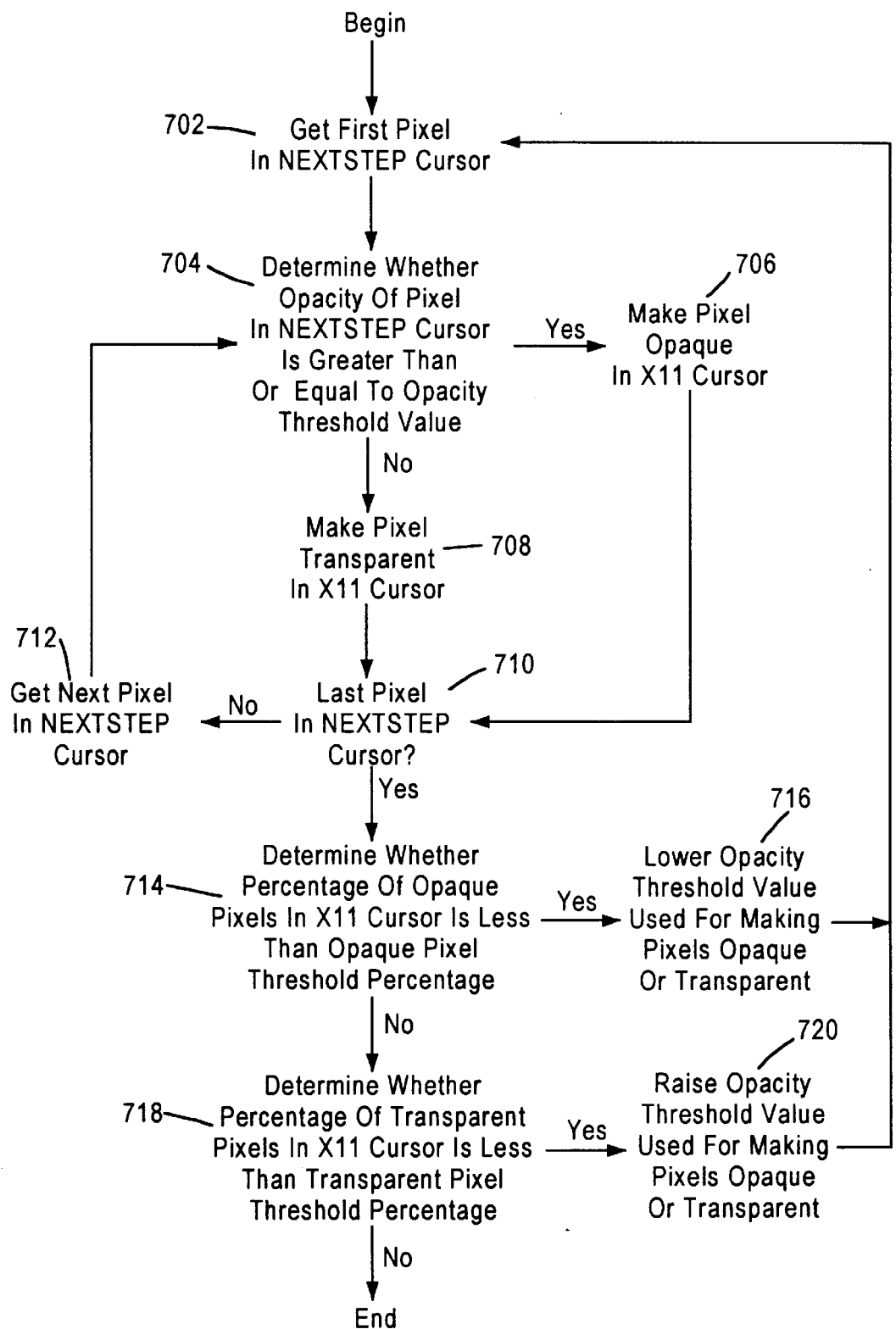
FIG. 7 is a flowchart illustrating in greater detail the preferred step of determining which pixels in a NEXTSTEP cursor are opaque in an X11 cursor, as generally illustrated in FIG. 6.

FIG. 7 illustrates the preferred step of determining which pixels in the NEXTSTEP cursor are opaque in the X11 cursor (step 602) in greater detail. Starting with a first pixel in the NEXTSTEP cursor (step 702), the image converter determines whether the opacity of the pixel in the NEXTSTEP cursor is greater than or equal to a certain opacity threshold value (step 704). In the preferred embodiment of the present invention, this opacity threshold value is 0.5 (assuming that the possible values for opacity range from 0.0 to 1.0, where 0.0 is completely transparent and 1.0 is completely opaque). If the opacity of the pixel in the NEXTSTEP cursor is greater than or equal to the opacity threshold value, the pixel is opaque in the X11 cursor (step 706). If the opacity of the pixel in the NEXTSTEP cursor is less than the opacity threshold value, the pixel is transparent in the X11 cursor (step 708). These steps are repeated for each pixel in the NEXTSTEP cursor (steps 710–712).

In order to ensure a minimum balance between the opaque and transparent pixels in the X11 cursor, after all of the pixels in the NEXTSTEP cursor have been made either opaque or transparent in the X11 cursor, the image converter determines whether the percentage of either the opaque or transparent pixels in the X11 cursor is less than a certain threshold percentage and, if so, adjusts the opacity threshold value used for making the pixels either opaque or transparent (steps 714–720). In the preferred embodiment of the present invention, this threshold percentage is twenty percent (20%) for the opaque pixels and five percent (5%) for the transparent pixels. More specifically, if the percentage of opaque pixels in the X11 cursor is less than the opaque pixel threshold percentage (step 714), the opacity threshold value used for making the pixels either opaque or transparent is lowered, e.g., from 0.5 to 0.25 (step 716). Conversely, if the percentage of transparent pixels in the X11 cursor is less than the transparent pixel threshold percentage (step 718), the opacity threshold value used for making the pixels either opaque or transparent is raised, e.g., from 0.5 to 0.75 (step 720). The above steps for making the pixels either opaque or transparent (steps 702–712) are then repeated using the adjusted opacity threshold value. Additionally, the above steps for ensuring a minimum balance between the opaque and transparent pixels (steps 714–720) are repeated. This process continues until the percentages of opaque and transparent pixels fall within the acceptable ranges.

Figure 8:
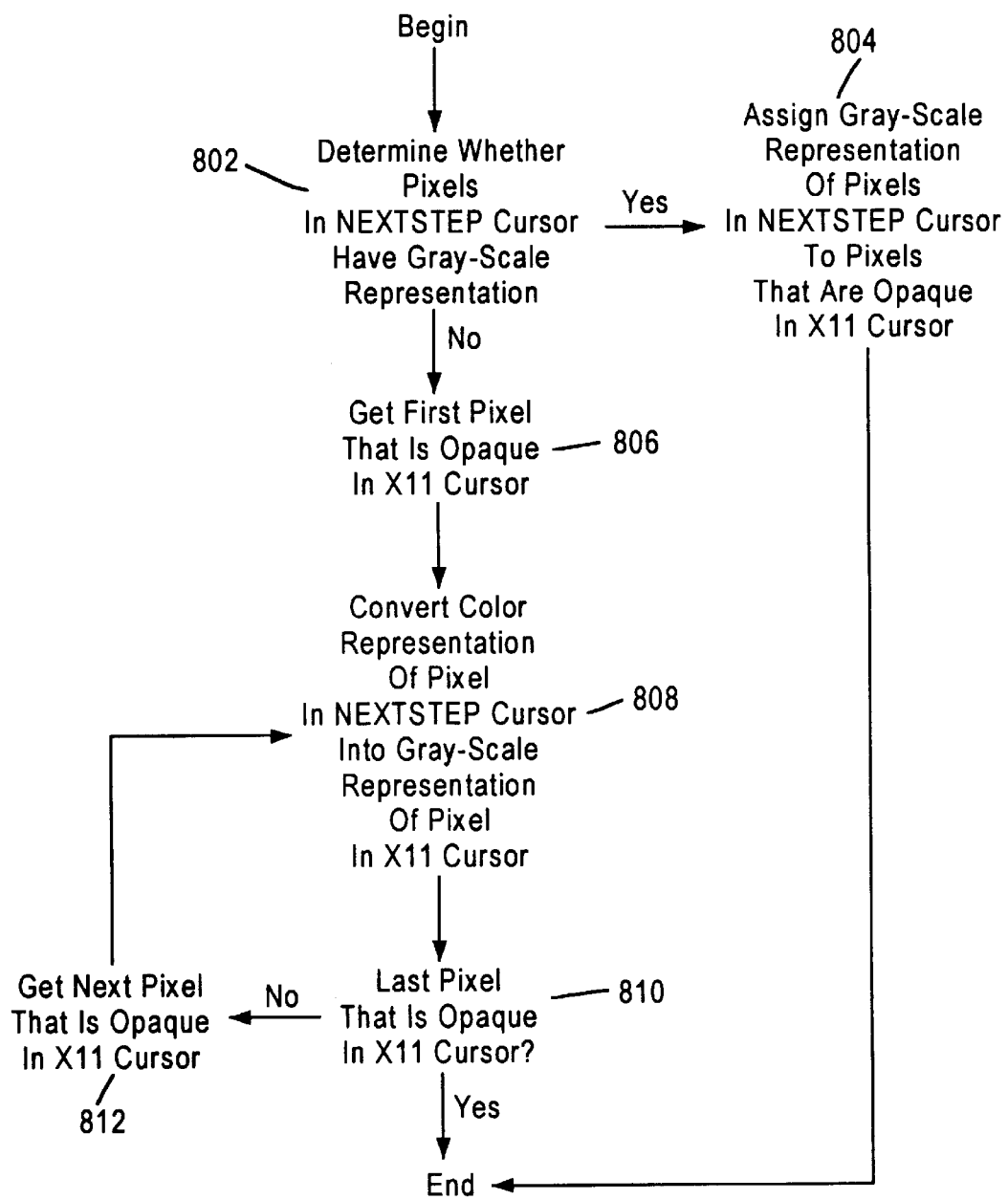
FIG. 8 is a flowchart illustrating in greater detail the preferred step of determining a gray-scale representation of the pixels that are opaque in the X11 cursor, as generally illustrated in FIG. 6.

FIG. 8 illustrates the preferred step of determining a gray-scale representation of the pixels that are opaque in the X11 cursor (step 604) in greater detail. Initially, the image converter determines whether the pixels in the NEXTSTEP cursor have a gray-scale representation (step 802). In many computer systems, the pixels in cursors have both a color representation and a gray-scale representation so that the cursors can be displayed on a color display device or a black-and-white display device. If the pixels in the NEXTSTEP cursor have a gray-scale representation, the gray-scale representation of the pixels in the NEXTSTEP cursor is assigned to the pixels that are opaque in the X11 cursor (step 804). If the pixels in the NEXTSTEP cursor do not have a gray-scale representation, the color representation of the pixels in the NEXTSTEP cursor is converted into a gray-scale representation of the pixels that are opaque in the X11 cursor (steps 806–812). Starting with a first pixel that is opaque in the X11 cursor (step 806), the image converter converts the color representation of the pixel in the NEXTSTEP cursor into the gray-scale representation of the pixel in the X11 cursor (step 808). The conversion of color representations of pixels into gray-scale representations of pixels is well-known in the art and will not be discussed in greater detail. This step is repeated for each pixel that is opaque in the X11 cursor (steps 810–812).

Figure 9:
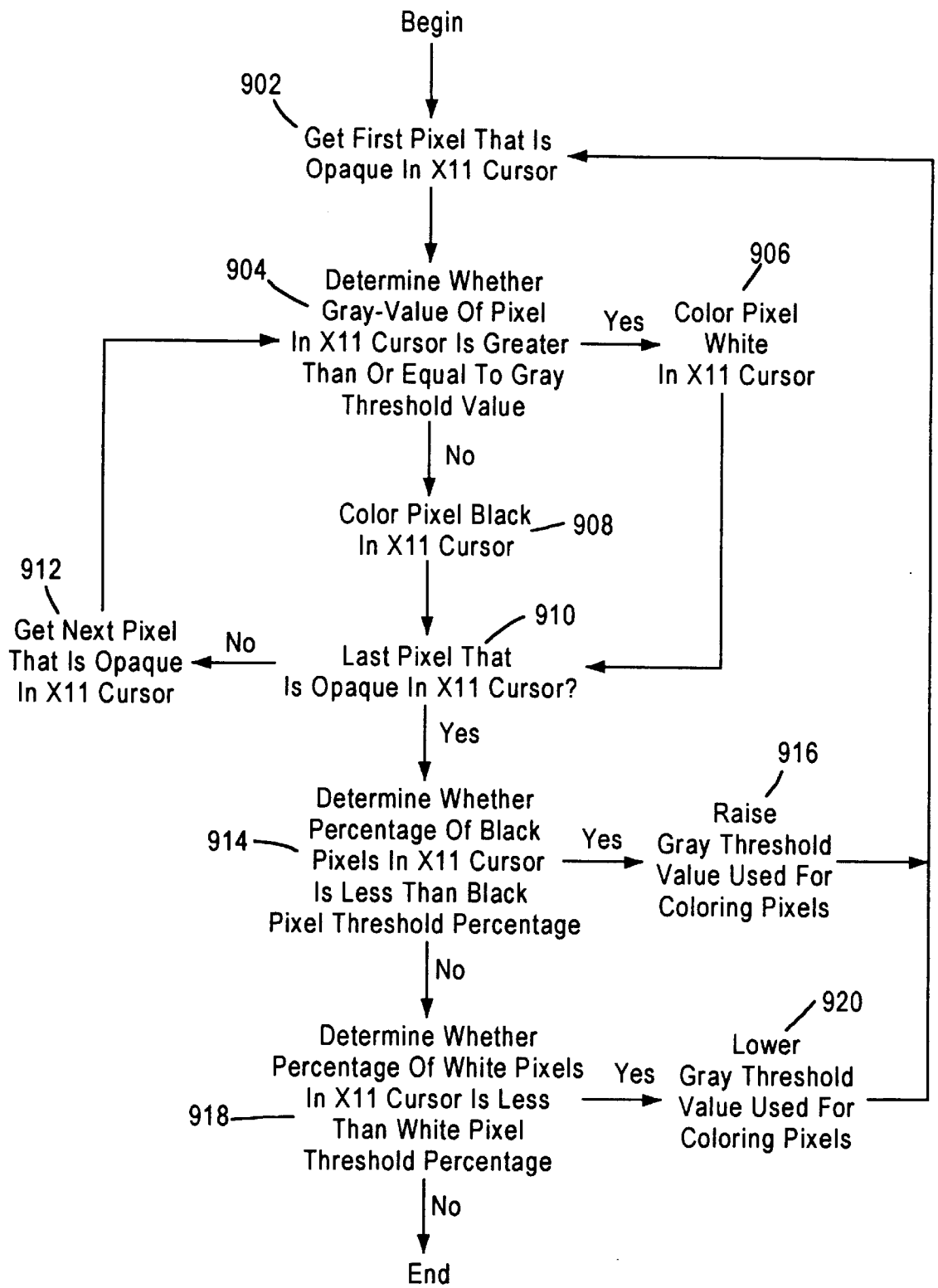
FIG. 9 is a flowchart illustrating in greater detail the preferred step of determining a black-and-white representation of the pixels that are opaque in the X11 cursor, as generally illustrated in FIG. 6.

FIG. 9 illustrates the preferred step of determining a black-and-white representation of the pixels that are opaque in the X11 cursor (step 606) in greater detail. Starting with the first pixel that is opaque in the X11 cursor (step 902), the image converter converts the gray-scale representation of the pixel in the X11 cursor into a black-and-white representation of the pixel in the X11 cursor (steps 904–908). More specifically, the image converter determines whether the gray-value of the pixel in the X11 cursor is greater than or equal to a certain gray threshold value (step 904). In the preferred embodiment of the present invention, this gray threshold value is 0.5 (assuming that the possible gray-values range from 0.0 to 1.0, where 0.0 is completely black and 1.0 is completely white). If the gray-value of the pixel in the X11 cursor is greater than or equal to the gray threshold value, the pixel is colored white in the X11 cursor (step 906). If the gray-value of the pixel in the X11 cursor is less than the gray threshold value, the pixel is colored black in the X11 cursor (step 908). These steps are repeated for each pixel that is opaque in the X11 cursor (steps 910–912).

In order to ensure a minimum balance between the foreground and background colors of the X11 cursor, after all of the pixels that are opaque in the X11 cursor have been colored either black or white, the image converter determines whether the percentage of either the black or white pixels in the X11 cursor is less than a certain threshold percentage and, if so, adjusts the gray threshold value used for coloring the pixels either black or white (steps 914–920). In the preferred embodiment of the present invention, this threshold percentage is twenty percent (20%) for both the black and white pixels. More specifically, if the percentage of black pixels in the X11 cursor is less than the black pixel threshold percentage (step 914), the gray threshold value used for coloring the pixels either black or white is raised, e.g., from 0.5 to 0.75 (step 916). Conversely, if the percentage of white pixels in the X11 cursor is less than the white pixel threshold percentage (step 918), the gray threshold value used for coloring the pixels either black or white is lowered, e.g., from 0.5 to 0.25 (step 920). The above steps for coloring the pixels either black or white (steps 902–912) are then repeated using the adjusted gray threshold value. Additionally, the above steps for ensuring a minimum balance between the foreground and background colors (steps 914–920) are repeated. This process continues until the percentages of black and white pixels fall within the acceptable ranges.

Figure 10:
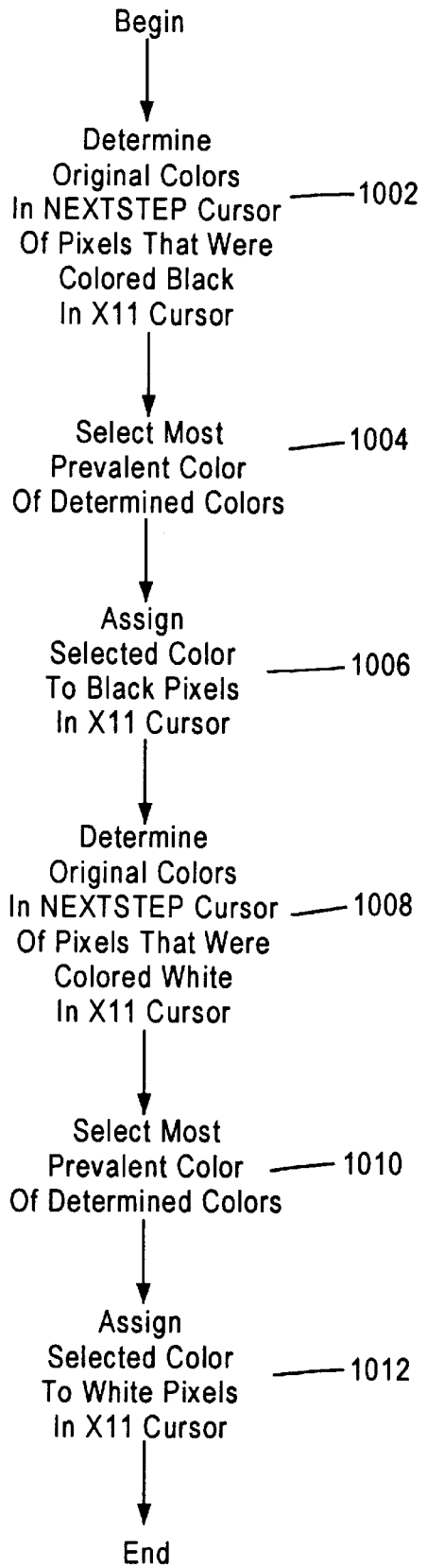
FIG. 10 is a flowchart illustrating in greater detail the preferred steps of determining colors assigned to the black and white pixels in the X11 cursor, as generally illustrating in FIG. 6.

FIG. 10 illustrates the preferred steps of determining the color assigned to the black pixels in the X11 cursor (step 608) and the color assigned to the white pixels in the X11 cursor (step 610) in greater detail. For the color assigned to the black pixels, the image converter determines the colors in the NEXTSTEP cursor of the pixels that were colored black in the X11 cursor, in step 908 (step 1002). Using the determined colors, the image converter selects the most prevalent color, i.e., the color occurring most frequently (step 1004). The image converter assigns the selected color to the black pixels in the X11 cursor (step 1006). Similarly, for the color assigned to the white pixels, the image converter determines the colors in the NEXTSTEP cursor of the pixels that were colored white in the X11 cursor, in step 906 (step 1008). Using the determined colors, the image converter selects the most prevalent color, i.e., the color occurring most frequently (step 1010). The image converter assigns the selected color to the white pixels in the X11 cursor (step 1012).

Figure 11:
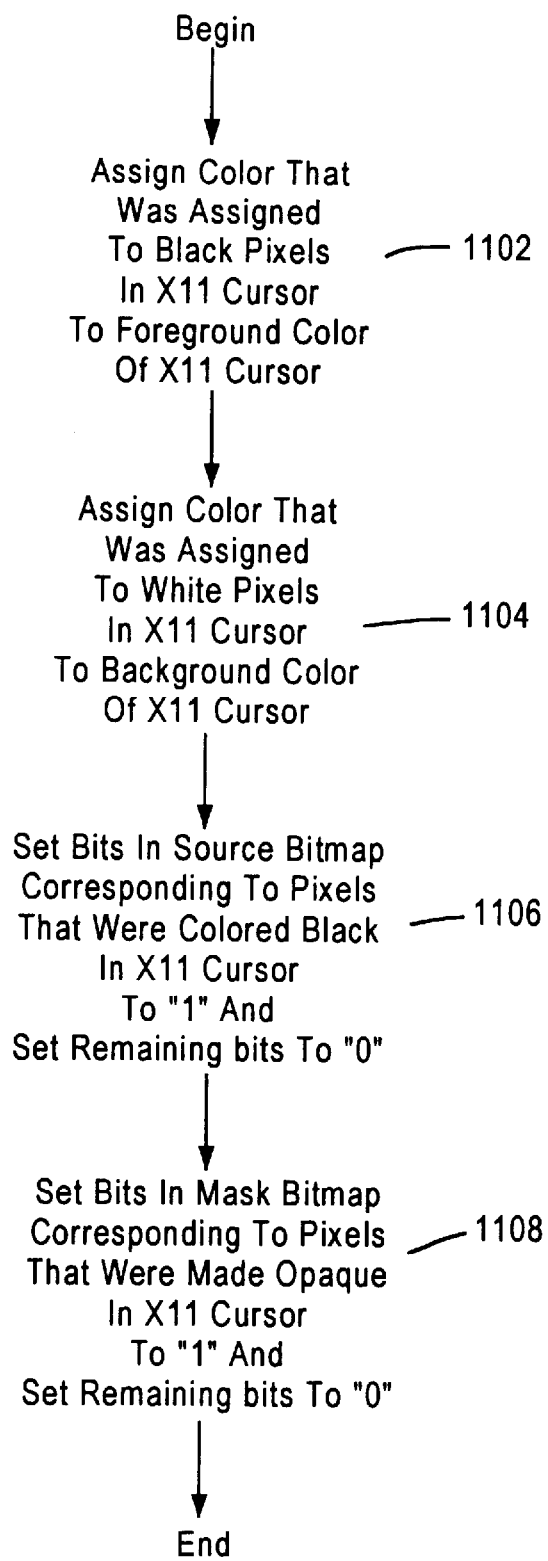
FIG. 11 is a flowchart illustrating in greater detail the preferred step of specifying a foreground color, a background color, a source bitmap, and a mask bitmap of the X11 cursor, as generally illustrated in FIG. 6.

FIG. 11 illustrates the preferred step of specifying the foreground color, the background color, the source bitmap, and the mask bitmap of the X11 cursor (step 612) in greater detail. The image converter assigns values to the foreground color, the background color, the source bitmap, and the mask bitmap of the X11 cursor as follows:

1. the foreground color—the color that was assigned to the black pixels in the X11 cursor, in step 1006, is assigned to the foreground color of the X11 cursor (step 1102);
2. the background color—the color that was assigned to the white pixels in the X11 cursor, in step 1012, is assigned to the background color of the X11 cursor (step 1104);
3. the source bitmap—the bits in the source bitmap corresponding to the pixels that were colored black in the X11 cursor, in step 908, are set to "1" and the remaining bits are set to "0" (step 1106); and
4. the mask bitmap—the bits in the mask bitmap corresponding to the pixels that were made opaque in the X11 cursor, in step 706, are set to "1" and the remaining bits are set to "0" (step 1108).

Figure 1:
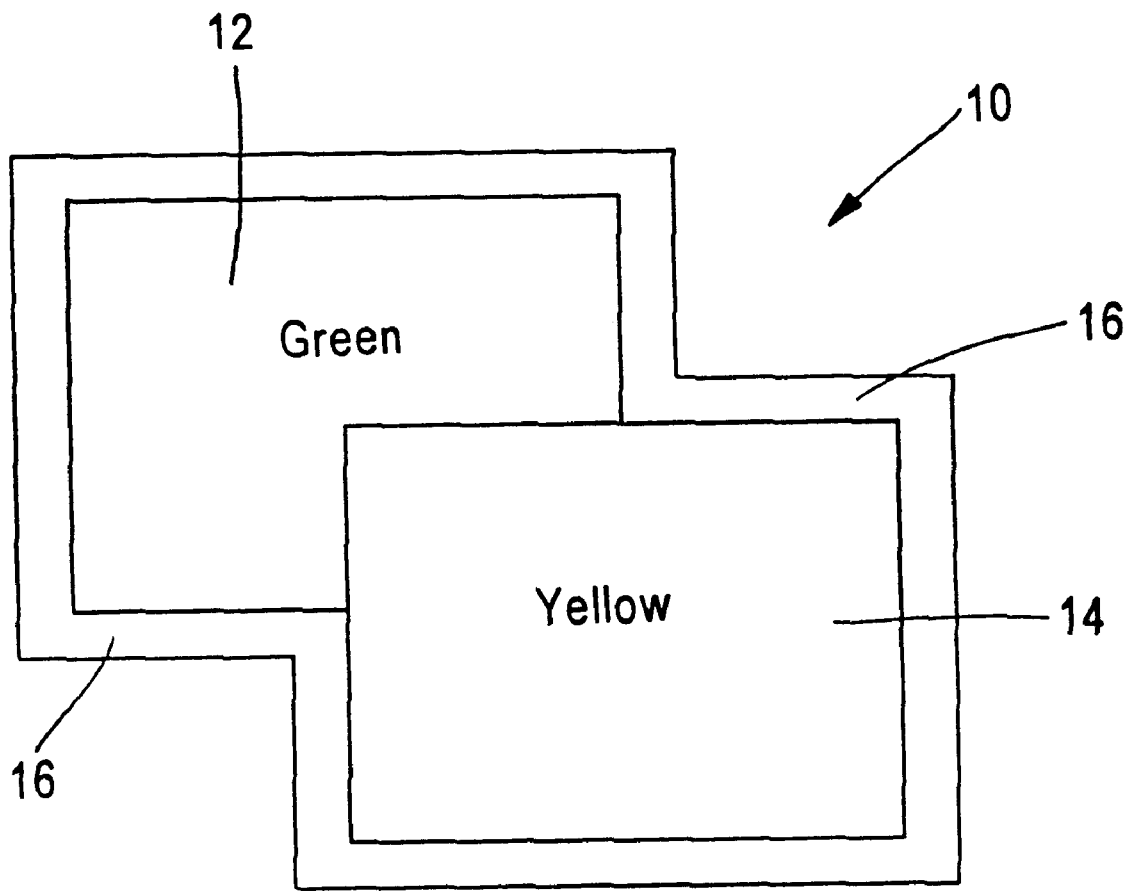
FIG. 1 is an original image, such as an original cursor.
Figure 2:
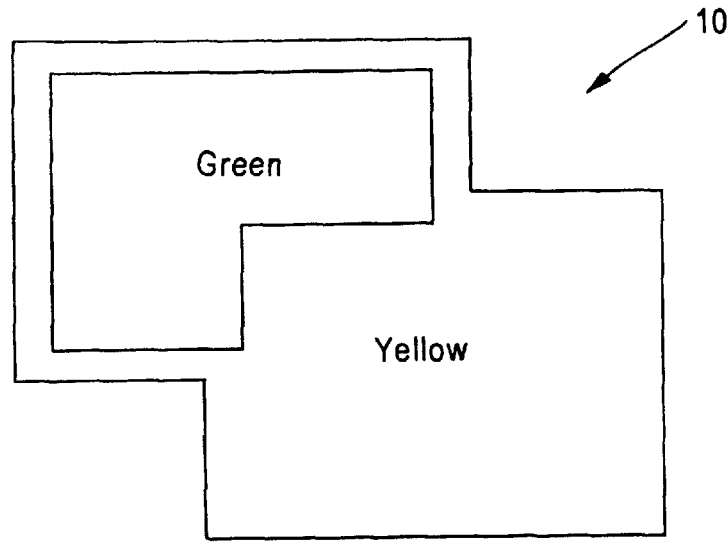
FIG. 2 is the cursor of FIG. 1 after being converted into another cursor having fewer colors than the original cursor using a known method for converting an image.
Figure 3:
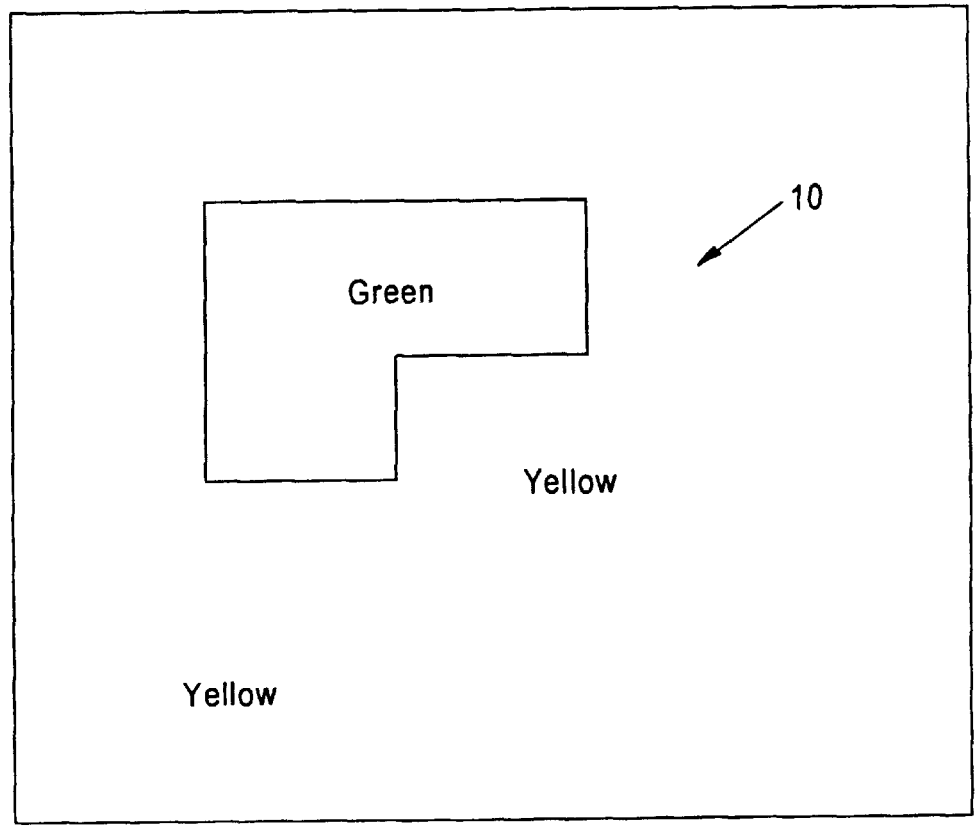
FIG. 3 is the converted cursor of FIG. 2 after being displayed on a background of the same color as one of the colors in the converted cursor.
Figure 12:
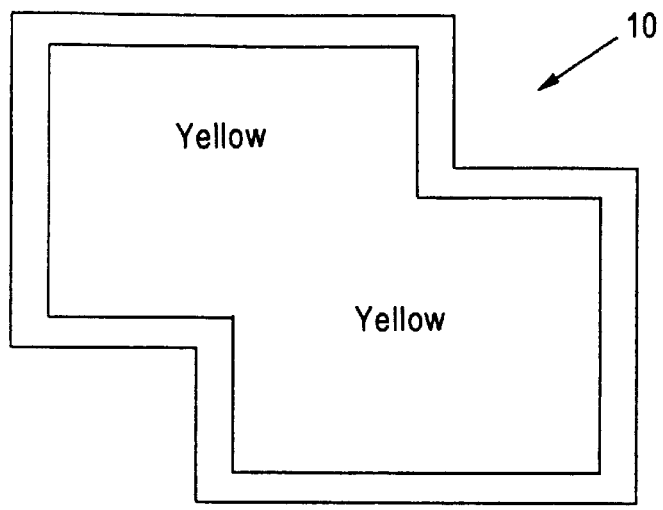
FIG. 12 is the cursor of FIG. 1 after being converted into another cursor having fewer colors than the original cursor using the method and system for converting an image of the present invention.
Figure 13:
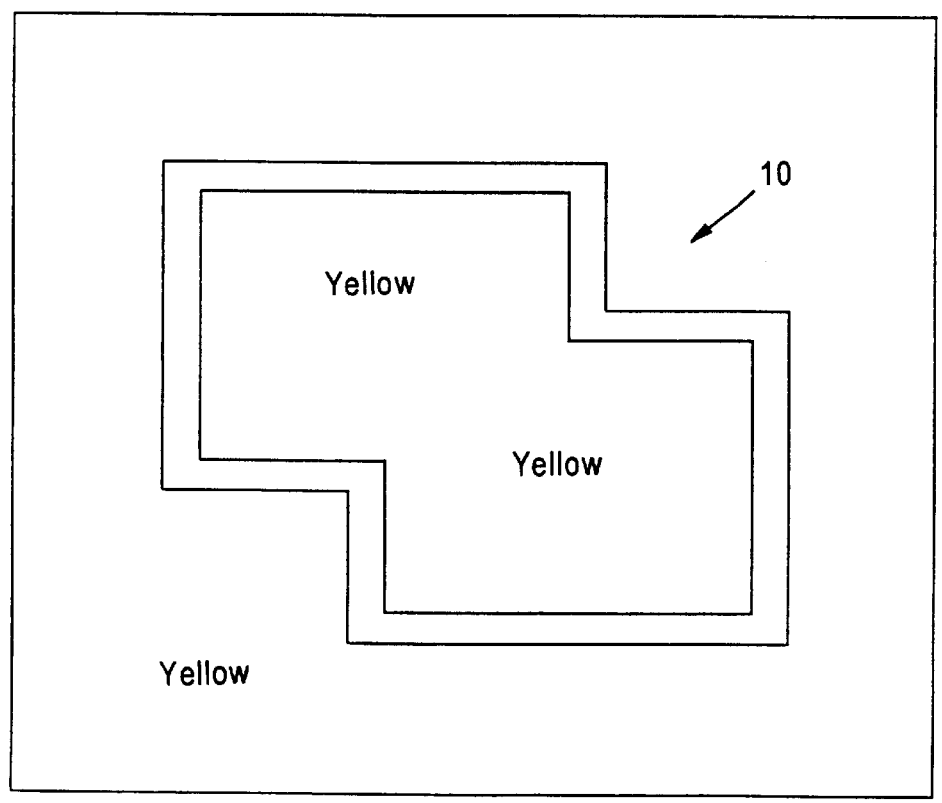
FIG. 13 is the converted cursor of FIG. 12 after being displayed on a background of the same color as one of the colors in the converted cursor.

FIG. 12 shows the cursor 10 of FIG. 1 after it has been converted into another cursor having two (2) colors using the method and system for converting an image of the present invention. As can be seen from the figures, the green block becomes yellow, the yellow block remains yellow, and the black border remains black. FIG. 13 shows the converted cursor of FIG. 12 after it has been displayed on a yellow background. As can be seen from a comparison of FIG. 3 and FIG. 13, the problems with the known conversion method do not occur with the conversion method and system of the present invention.

One of ordinary skill in the art will now appreciate that the preferred embodiment of the present invention provides a method and system in computer systems for converting an original image into another image having fewer colors than the original image. This method and system attempt to preserve the contrast of the original image. As a result, this method and system are particularly well-suited for converting images that are relatively small in size.

In a preferred embodiment of the present invention, the converted image has two (2) colors. As described above, after a gray-scale representation of the pixels in the converted image is determined, a black-and-white representation of the pixels in the converted image is determined. Then, one of the two (2) colors is assigned to the black pixels in the converted image and the other of the two (2) colors is assigned to the white pixels in the converted image. However, one of ordinary skill in the art will appreciate that the converted image could have more than two (2) colors. If the converted image has p colors (where p is greater than two (2)), after the first gray-scale representation of the pixels in the converted image is determined, a second gray-scale representation of the pixels in the converted image is determined.

In the second gray-scale representation, there are a number of gray-levels, where the number of gray-levels is equal to the number of colors in the converted image (e.g., if there are p colors in the converted image, there are p gray-levels in the second gray-scale representation). Each pixel is assigned to a gray-level in the second gray-scale representation based on the gray-value of the pixel in the first gray-scale representation. More specifically, upper and lower gray threshold values are set for each gray-level and each pixel is assigned to the gray-level in which the gray-value of the pixel falls. In order to ensure a minimum balance between the colors in the converted image, after all of the pixels have been assigned to a gray-level, the percentage of the pixels in each gray-level in the converted image could be determined and if any is below a certain gray threshold percentage, the gray threshold values used for assigning the pixels to the gray-levels could be adjusted. Then, one of the p colors is assigned to the pixels in each of the gray-levels in the converted image.

Additionally, in a preferred embodiment of the present invention, the original image and the converted image are color images. However, one of ordinary skill in the art will appreciate that the original image could be a gray image and the converted image could be a black-and-white image or a gray image having fewer levels of gray than the original image. The principles of the present invention could be utilized to convert the gray image into the black-and-white image or the gray image having fewer levels of gray than the original image.

Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A method executed in a computer system for converting an image, the method comprising the steps of:

receiving an original image to be displayed, the original image including a plurality of pixels, each pixel having a color associated with the pixel;

converting the original image into another image having fewer colors than the original image by:

determining a first gray-scale representation of the pixels in the converted image so that each pixel has a gray-value in the converted image;

determining a second gray-scale representation of the pixels in the converted image so that each pixel is assigned to a gray-level in the converted image, wherein the number of gray-levels in the converted image is equal to the number of colors in the converted image;

determining a color assigned to the pixels in each gray-level in the converted image; and specifying a representation of the converted image using the determined second gray-scale representation and the determined colors; and displaying the converted image using the specified representation of the converted image.

2. The method of claim 1, wherein each pixel in the original image has an opacity associated with the pixel;

wherein the step of converting the original image further includes the step of determining which pixels in the original image are opaque in the converted image;

wherein the step of determining a first gray-scale representation of the pixels in the converted image includes the step of determining a first gray-scale representation of the pixels that are opaque in the converted image; and wherein the step of determining a second gray-scale representation of the pixels in the converted image includes the step of determining a second gray-scale representation of the pixels that are opaque in the converted image.

3. The method of claim 2, wherein the step of determining which pixels in the original image are opaque in the converted image includes the steps of:

for each pixel in the original image, determining whether the opacity of the pixel in the original image is greater than or equal to an opacity threshold value and, if so, making the pixel opaque in the converted image, otherwise, making the pixel transparent in the converted image.

4. The method of claim 3, wherein the step of converting the original image further includes the steps of:

determining whether the percentage of the opaque pixels in the converted image is less than an opaque pixel threshold percentage and, if so, lowering the opacity threshold value used for making the pixels either opaque or transparent and then repeating the step of determining which pixels in the original image are opaque in the converted image using the lowered opacity threshold value; and determining whether the percentage of the transparent pixels in the converted image is less than a transparent pixel threshold percentage and, if so, raising the opacity threshold value used for making the pixels either opaque or transparent and then repeating the step of determining which pixels in the original image are opaque in the converted image using the raised opacity threshold value.

5. The method of claim 1, wherein the step of determining a first gray-scale representation of the pixels in the converted image includes the step of:

for each pixel in the converted image, converting a color representation of the pixel in the original image into a first gray-scale representation of the pixel in the converted image.

6. The method of claim 1, wherein the step of determining a second gray-scale representation of the pixels in the converted image includes the step of:

for each pixel in the converted image, converting the first gray-scale representation of the pixel in the converted image into a second gray-scale representation of the pixel in the converted image by determining the gray-level in which the gray-value of the pixel in the converted image falls and assigning the pixel to the determined gray-level in the converted image.

7. The method of claim 6, wherein the step of converting the original image further includes the steps of:

determining whether the percentage of the pixels in any of the gray-levels in the converted image is less than a gray threshold percentage and, if so, adjusting the gray-levels and then repeating the step of determining a second gray-scale representation of the pixels in the converted image using the adjusted gray-levels.

8. The method of claim 1, wherein the step of determining a color assigned to the pixels in each gray-level in the converted image includes the steps of:

for each gray-level in the converted image, determining the colors in the original image of the pixels that were assigned to the gray-level in the converted image;

selecting the most prevalent color of the determined colors; and assigning the selected color to the pixels in the gray-level in the converted image.

9. The method of claim 1, wherein the converted image has two colors; and wherein the step of determining a second gray-scale representation of the pixels in the converted image includes the step of:

determining a black-and-white representation of the pixels in the converted image so that each pixel is colored either black or white in the converted image.

10. The method of claim 9, wherein the step of determining a black-and-white representation of the pixels in the converted image includes the step of:

for each pixel in the converted image, converting the first gray-scale representation of the pixel in the converted image into a black-and-white representation of the pixel in the converted image by determining whether the gray-value of the pixel in the converted image is greater than or equal to a gray threshold value and, if so, coloring the pixel white in the converted image, otherwise, coloring the pixel black in the converted image.

11. The method of claim 10, wherein the step of converting the original image further includes the steps of:

determining whether the percentage of the black pixels in the converted image is less than a black pixel threshold percentage and, if so, raising the gray threshold value used for coloring the pixels either black or white and then repeating the step of determining a black-and-white representation of the pixels in the converted image using the raised gray threshold value; and determining whether the percentage of the white pixels in the converted image is less than a white pixel threshold percentage and, if so, lowering the gray threshold value used for coloring the pixels either black or white and then repeating the step of determining a black-and-white representation of the pixels in the converted image using the lowered gray threshold value.

12. The method of claim 11, wherein the step of determining a color assigned to the pixels in each gray-level in the converted image includes the steps of:

determining a color assigned to the black pixels in the converted image; and determining a color assigned to the white pixels in the converted image.

13. The method of claim 12, wherein the step of determining a color assigned to the black pixels in the converted image includes the steps of:

determining the colors in the original image of the pixels that were colored black in the converted image;

selecting the most prevalent color of the determined colors; and assigning the selected color to the black pixels in the converted image; and wherein the step of determining a color assigned to the white pixels in the converted image includes the steps of:

determining the colors in the original image of the pixels that were colored white in the converted image;

selecting the most prevalent color of the determined colors; and assigning the selected color to the white pixels in the converted image.

14. The method of claim 13, wherein each pixel in the original image has an opacity associated with the pixel;

wherein the step of converting the original image further includes the step of determining which pixels in the original image are opaque in the converted image by, for each pixel in the original image, determining whether the opacity of the pixel in the original image is greater than or equal to an opacity threshold value and, if so, making the pixel opaque in the converted image, otherwise, making the pixel transparent in the converted image;

wherein the step of determining a first gray-scale representation of the pixels in the converted image includes the step of determining a first gray-scale representation of the pixels that are opaque in the converted image; and wherein the step of determining a black-and-white representation of the pixels in the converted image includes the step of determining a black-and-white representation of the pixels that are opaque in the converted image.

15. The method of claim 14, wherein the specified representation of the converted image includes a foreground color, a background color, a source bitmap, and a mask bitmap, the source bitmap including a bit corresponding to each pixel in the converted image, and the mask bitmap including a bit corresponding to each pixel in the converted image; and wherein the step of specifying a representation of the converted image includes the step of specifying the foreground color, the background color, the source bitmap, and the mask bitmap of the converted image by:

assigning the color that was assigned to the black pixels in the converted image to the foreground color of the converted image;

assigning the color that was assigned to the white pixels in the converted image to the background color of the converted image;

setting the bits in the source bitmap corresponding to the pixels that were colored black in the converted image to "1" and setting the remaining bits to "0"; and setting the bits in the mask bitmap corresponding to the pixels that were made opaque in the converted image to "1" and setting the remaining bits to "0".

16. The method of claim 1, wherein the original image and the converted image are cursors.

17. The method of claim 16, wherein the original image is a NEXTSTEP cursor and the converted image is an X11 cursor.

18. A computer program product for converting an image in a computer system, the computer program product comprising:

computer readable program code configured to receive an original image to be displayed, the original image including a plurality of pixels, each pixel having a color associated with the pixel;

computer readable program code configured to convert the original image into another image having fewer colors than the original image so that the converted image can be displayed including:

computer readable program code configured to determine a first gray-scale representation of the pixels in the converted image so that each pixel has a gray-value in the converted image;

computer readable program code configured to determine a second gray-scale representation of the pixels in the converted image so that each pixel is assigned to a gray-level in the converted image, wherein the number of gray-levels in the converted image is equal to the number of colors in the converted image;

computer readable program code configured to determine a color assigned to the pixels in each gray-level in the converted image; and computer readable program code configured to specify a representation of the converted image using the determined second gray-scale representation and the determined colors; and a computer readable medium in which the computer readable program codes are stored.

19. The computer program product of claim 18, wherein each pixel in the original image has an opacity associated with the pixel;

wherein the computer readable program code configured to convert the original image further includes computer readable program code configured to determine which pixels in the original image are opaque in the converted image;

wherein the computer readable program code configured to determine a first gray-scale representation of the pixels in the converted image includes computer readable program code configured to determine a first gray-scale representation of the pixels that are opaque in the converted image; and wherein the computer readable program code configured to determine a second gray-scale representation of the pixels in the converted image includes computer readable program code configured to determine a second gray-scale representation of the pixels that are opaque in the converted image.

20. The computer program product of claim 19, wherein the computer readable program code configured to determine which pixels in the original image are opaque in the converted image includes:

computer readable program code configured to, for each pixel in the original image, determine whether the opacity of the pixel in the original image is greater than or equal to an opacity threshold value and, if so, make the pixel opaque in the converted image, otherwise, make the pixel transparent in the converted image.

21. The computer program product of claim 20, wherein the computer readable program code configured to convert the original image further includes:

computer readable program code configured to determine whether the percentage of the opaque pixels in the converted image is less than an opaque pixel threshold percentage and, if so, lower the opacity threshold value used for making the pixels either opaque or transparent and then determine which pixels in the original image are opaque in the converted image using the lowered opacity threshold value; and computer readable program code configured to determine whether the percentage of the transparent pixels in the converted image is less than a transparent pixel threshold percentage and, if so, raise the opacity threshold value used for making the pixels either opaque or transparent and then determine which pixels in the original image are opaque in the converted image using the raised opacity threshold value.

22. The computer program product of claim 18, wherein the computer readable program code configured to determine a first gray-scale representation of the pixels in the converted image includes:

computer readable program code configured to, for each pixel in the converted image, convert a color representation of the pixel in the original image into a first gray-scale representation of the pixel in the converted image.

23. The computer program product of claim 18, wherein the computer readable program code configured to determine a second gray-scale representation of the pixels in the converted image includes:

computer readable program code configured to, for each pixel in the converted image, convert the first gray-scale representation of the pixel in the converted image into a second gray-scale representation of the pixel in the converted image by determining in which gray-level the gray-value of the pixel in the converted image falls and assigning the determined gray-level to the pixel in the converted image.

24. The computer program product of claim 23, wherein the computer readable program code configured to convert the original image further includes:

computer readable program code configured to determine whether the percentage of the pixels in any of the gray-levels in the converted image is less than a gray threshold percentage and, if so, adjust the gray-levels and then determine a second gray-scale representation of the pixels in the converted image using the adjusted gray-levels.

25. The computer program product of claim 18, wherein the computer readable program code configured to determine a color assigned to the pixels in each gray-level in the converted image includes:

computer readable program code configured to, for each gray-level in the converted image, determine the colors in the original image of the pixels that were assigned to the gray-level in the converted image;

select the most prevalent color of the determined colors; and assign the selected color to the pixels in the gray-level in the converted image.

26. A system for converting an image in a computer system, the system comprising:

a computer configured to control the operation of the system;

a display device connected to said computer configured to display an image;

a secondary storage device connected to said computer; and an image converter stored in said secondary storage device and executed by said computer, said image converter being configured to:

receive an original image to be displayed, the original image including a plurality of pixels, each pixel having a color associated with the pixel; and convert the original image into another image having fewer colors than the original image so that the converted image can be displayed by:

determining a first gray-scale representation of the pixels in the converted image so that each pixel has a gray-value in the converted image;

determining a second gray-scale representation of the pixels in the converted image so that each pixel is assigned to a gray-level in the converted image, wherein the number of gray-levels in the converted image is equal to the number of colors in the converted image;

determining a color assigned to the pixels in each gray-level in the converted image; and specifying a representation of the converted image using the determined second gray-scale representation and the determined colors.

27. The system of claim 26, wherein each pixel in the original image has an opacity associated with the pixel; and wherein said image converter is further configured to:

determine which pixels in the original image are opaque in the converted image;

determine a first gray-scale representation of the pixels that are opaque in the converted image; and determine a second gray-scale representation of the pixels that are opaque in the converted image.

28. The system of claim 27, wherein said image converter is further configured to:

for each pixel in the original image, determine whether the opacity of the pixel in the original image is greater than or equal to an opacity threshold value and, if so, make the pixel opaque in the converted image, otherwise, make the pixel transparent in the converted image.

29. The system of claim 28, wherein said image converter is further configured to:

determine whether the percentage of the opaque pixels in the converted image is less than an opaque pixel threshold percentage and, if so, lower the opacity threshold value used for making the pixels either opaque or transparent and then determine which pixels in the original image are opaque in the converted image using the lowered opacity threshold value; and determine whether the percentage of the transparent pixels in the converted image is less than a transparent pixel threshold percentage and, if so, raise the opacity threshold value used for making the pixels either opaque or transparent and then determine which pixels in the original image are opaque in the converted image using the raised opacity threshold value.

30. The system of claim 26, wherein said image converter is further configured to:

for each pixel in the converted image, convert a color representation of the pixel in the original image into a first gray-scale representation of the pixel in the converted image.

31. The system of claim 26, wherein said image converter is further configured to:

for each pixel in the converted image, convert the first gray-scale representation of the pixel in the converted image into a second gray-scale representation of the pixel in the converted image by determining in which gray-level the gray-value of the pixel in the converted image falls and assigning the determined gray-level to the pixel in the converted image.

32. The system of claim 31, wherein said image converter is further configured to:

determine whether the percentage of the pixels in any of the gray-levels in the converted image is less than a gray threshold percentage and, if so, adjust the gray-levels and then determine a second gray-scale representation of the pixels in the converted image using the adjusted gray-levels.

33. The system of claim 26, wherein said image converter is further configured to:

for each gray-level in the converted image,
determine the colors in the original image of the pixels that were assigned to the gray-level in the converted image;
select the most prevalent color of the determined colors; and
assign the selected color to the pixels in the gray-level in the converted image.

34. The system of claim 26, wherein said computer is a stand-alone computer.

35. The system of claim 26, wherein said computer is connected to a network.

* * * * *